(12) United States Patent
Nakayama

(10) Patent No.: US 9,994,122 B2
(45) Date of Patent: Jun. 12, 2018

(54) ELECTRIC PROPULSION MACHINE AND BATTERY UNIT

(71) Applicant: YAMAHA HATSUDOKI KABUSHIKI KAISHA, Iwata-shi, Shizuoka (JP)

(72) Inventor: Hiroyuki Nakayama, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days. days.

(21) Appl. No.: 15/292,201

(22) Filed: Oct. 13, 2016

(65) Prior Publication Data

US 2017/0190265 A1    Jul. 6, 2017

(30) Foreign Application Priority Data

Oct. 16, 2015  (JP) ................... 2015-204485

(51) Int. Cl.
*G05B 5/00* (2006.01)
*B60L 15/20* (2006.01)
*B60L 11/18* (2006.01)
*H02P 27/08* (2006.01)

(52) U.S. Cl.
CPC .......... *B60L 15/20* (2013.01); *B60L 11/1879* (2013.01); *H02P 27/08* (2013.01); *B60L 2200/12* (2013.01); *B60L 2240/54* (2013.01); *B60L 2250/16* (2013.01)

(58) Field of Classification Search
CPC ..... B60L 11/1879; B60L 2240/54; B60K 1/04
See application file for complete search history.

(56) References Cited

U.S. PATENT DOCUMENTS

2011/0226539 A1*  9/2011  Huss ................. B60K 6/46
                                              180/65.21
2013/0027052 A1*  1/2013  Matsumoto ........ B62J 99/00
                                              324/511

FOREIGN PATENT DOCUMENTS

| DE | 197 28 253 A1 | 1/1998 |
| EP | 0 697 333 A1 | 2/1996 |
| EP | 1 415 904 A2 | 5/2004 |
| JP | 09-193877 A | 7/1997 |
| JP | 2013-126788 A | 6/2013 |

* cited by examiner

*Primary Examiner* — Karen Masih
(74) *Attorney, Agent, or Firm* — Keating and Bennett, LLP

(57) ABSTRACT

An electric propulsion machine includes an electric motor, an electric motor control circuit, a propulsion device to generate thrust from an output of the electric motor, and a battery unit to supply electric power to the electric motor. The battery unit includes a mode selector to accept a designation of an operating mode. The electric motor control circuit outputs a control signal that controls the electric motor based on an operating mode which is designated from among a plurality of operating modes.

20 Claims, 13 Drawing Sheets

ELECTRIC PROPULSION MACHINE AND BATTERY UNIT

BACKGROUND OF THE INVENTION

1. Field of the Invention

The present invention relates to a technique involving switching of an operating mode in an electric propulsion machine.

2. Description of the Related Art

In a vehicle which generates thrust by at least using electricity, a mechanism to switch between different output settings of thrust may often be provided.

For example, Japanese Laid-Open Patent Publication No. 2013-126788 discloses a technique which, in a hybrid vehicle including an engine and a motor, allows a travel mode to be selected. By manipulating switches and the like which are provided near the driver's seat or images of switches which are displayed on a touch screen display, a driver is able to select a travel mode. In the disclosed technique, the following modes are selectable as the travel mode: an EV mode in which only the motor is utilized, an ECO mode which places more importance on mileage, a normal mode, a power mode which utilizes both the engine and the motor to achieve greater power, and so on. Improved operability is achieved by disposing the switches and the like for mode selection near the driver's seat.

On the other hand, Japanese Laid-Open Patent Publication No. 9-193877 discloses a technique which permits mode switching in an electrically-assisted tricycle between an electric mode, an assisted mode, and a manpower mode. By manipulating switches which are provided around the handlebar, a rider is able to select from among these modes. In Japanese Laid-Open Patent Publication No. 9-193877, too, improved operability is achieved by disposing the switches around the handlebar.

However, there may be cases where the switches and the like used to select from among a plurality of travel modes should not be readily operable by the rider or driver. For example, vehicles which are intended for young and elderly users, vehicles at a driving school, and vehicles to be ridden or driven by beginners may need to operate in a particular manner which has been set by an administrator. Specifically, there may be cases where an administrator needs to previously set a restriction on the output of drive power, such that this setting cannot be readily changed.

SUMMARY OF THE INVENTION

Preferred embodiments of the present invention provide a technique which, in an electric propulsion machine that generates thrust by at least using electricity, restricts changes in an operating mode that has been set by an administrator.

An electric propulsion machine according to a preferred embodiment of the present invention includes an electric motor; an electric motor control circuit to output a control signal to control the electric motor based on an operating mode which is designated from among a plurality of operating modes; a propulsion device to generate thrust from an output of the electric motor; and a battery unit to supply electric power to the electric motor, the battery unit including a mode selector via which to accept a designation of the operating mode.

In a preferred embodiment of the present invention, the battery unit is detachable and includes a connector which, when the battery unit is mounted to the electric propulsion machine, electrically connects the battery unit to the electric motor and to the electric motor control circuit of the electric propulsion machine.

In a preferred embodiment of the present invention, the battery unit is able to accept a designation of the operating mode while being detached from the electric propulsion machine.

In a preferred embodiment of the present invention, the battery unit includes a storage to store mode information identifying the designated operating mode.

In a preferred embodiment of the present invention, the battery unit further includes an electrical storage to store electricity and a battery control circuit to control an electric power which occurs through discharge from the electrical storage; and when the battery unit is mounted to the electric propulsion machine, the battery control circuit reads the mode information from the storage, and sends the mode information to the electric motor control circuit.

In a preferred embodiment of the present invention, the electric propulsion machine further includes a main switch to power on the electric propulsion machine; and when the battery unit is mounted to the electric propulsion machine, the battery control circuit reads the mode information from the storage in response to turning ON of the main switch.

In a preferred embodiment of the present invention, in response to turning ON of the main switch, the electric motor control circuit outputs a data request; and in response to receiving the data request, the battery control circuit reads the mode information from the storage.

In a preferred embodiment of the present invention, the battery unit further includes a display to indicate a remaining amount of electricity stored in the electrical storage; and when the mode selector receives a predetermined manipulation, the display indicates the remaining amount of electricity.

In a preferred embodiment of the present invention, the mode selector is a hardware switch or button.

In a preferred embodiment of the present invention, the battery unit further includes a display; a control circuit to cause the display to indicate information of the plurality of operating modes; and a touch screen panel to accept a designation of an operating mode which is selected from among the plurality of operating modes indicated on the display; and the mode selector includes the display and the touch screen panel.

In a preferred embodiment of the present invention, the electric propulsion machine further includes a seat for a driver or rider to sit on, wherein the battery unit is disposed below the seat.

In a preferred embodiment of the present invention, the plurality of operating modes differ from one another in terms of a relationship between an output torque and a number of revolutions of the electric motor.

In a preferred embodiment of the present invention, the plurality of operating modes are provided as a table describing a relationship between an output torque and a number of revolutions of the electric motor; or a mathematical function.

In a preferred embodiment of the present invention, the electric propulsion machine further includes a mode selection switch to select from among the plurality of operating modes, the mode selection switch being distinct from the mode selector, wherein, when an operating mode selected with the mode selection switch and an operating mode designated with the mode selector are not identical, the electric motor control circuit selects the operating mode which has a lower output torque.

In a preferred embodiment of the present invention, the electric propulsion machine further includes a mode selection switch to select from among the plurality of operating modes, the mode selection switch being distinct from the mode selector, wherein, when no operating mode has been set by the mode selector, or the mode selector has set a free mode to permit free switching of operating modes, the electric motor control circuit selects the operating mode selected with the mode selection switch.

A battery unit according to a preferred embodiment of the present invention is able to be mounted to an electric propulsion machine that supplies electric power, the battery unit including an electrical storage to store electricity; a connector to output an electric power which occurs through discharge from the electrical storage; a battery control circuit to control the electric power which is output from the connector; a mode selector to accept a designation of an operating mode for the electric propulsion machine; and a case accommodating the electrical storage and the battery control circuit, the connector and the mode selector being provided on the case.

In a preferred embodiment of the present invention, when the connector is electrically connected to the electric propulsion machine, the battery control circuit outputs mode information identifying the designated operating mode from the connector.

In a preferred embodiment of the present invention, the battery control circuit outputs the mode information in response to turning ON of a main switch of the electric propulsion machine.

In a preferred embodiment of the present invention, the battery unit further includes a storage; and the storage stores mode information identifying the operating mode designated with the mode selector.

In a preferred embodiment of the present invention, the battery unit further includes a display to indicate a remaining amount of electricity stored in the electrical storage, wherein, when the mode selector accepts a predetermined manipulation, the display indicates the remaining amount of electricity.

A battery unit to be mounted to an electric propulsion machine includes a mode selector which accepts a designation of an operating mode. As the battery unit is mounted to the electric propulsion machine, an operating mode is set to the electric propulsion machine. Since a rider or driver of the electric propulsion machine cannot access the battery unit while riding/driving it, the rider or driver is unable to change the operating mode by manipulating the mode selector. As a result, an administrator is able to permit use of the electric propulsion machine without allowing arbitrary changing of an operating mode which he or she has set.

In an electric propulsion machine according to a preferred embodiment of the present invention, a battery unit includes a mode selector which accepts a designation of an operating mode. The mode selector may be a switch or a button which is provided in hardware form and/or in software form that is displayed on a display screen, for example. While riding/driving the electric propulsion machine, the rider or driver usually will not access the battery unit, and therefore the operating mode will not be changed through manipulation of the mode selector. This makes it possible to restrict changes from being made in an operating mode that has been set by an administrator.

These general and specific aspects may be implemented using a machine, a method, and a computer program, and any combination of systems, methods, and computer programs.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 9 is a diagram for explaining a method of setting an operating mode in accordance with an amount of time of pressing a battery level indicator switch 24a.

DETAILED DESCRIPTION OF THE PREFERRED EMBODIMENTS

Figure 1:
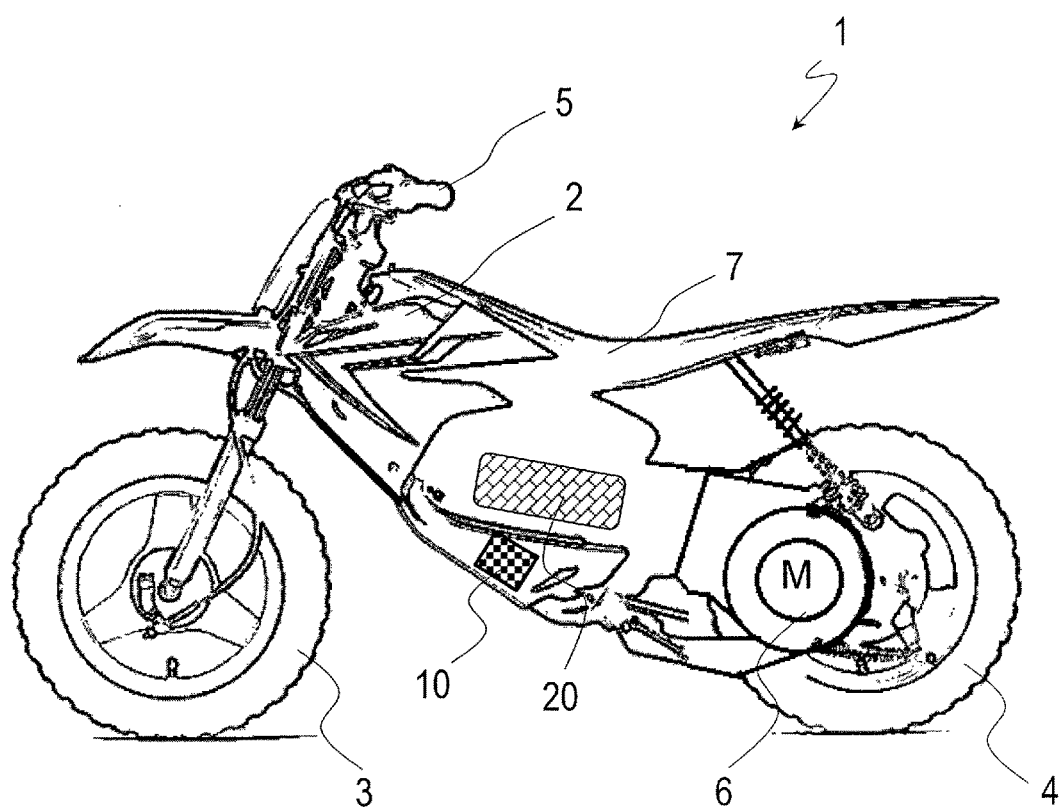
FIG. 1 is an external side view of a two-wheeled electric vehicle 1 according to a preferred embodiment of the present invention.

Hereinafter, with reference to the drawings, preferred embodiments of the present invention will be described. Identical component elements will be denoted by identical reference numerals, and any redundant description thereof will be omitted. Note that the present invention is not to be limited to the following preferred embodiments.

Techniques which will be described below are applicable to any vehicle, machine, system or the like that generates thrust by utilizing electric power from a battery unit. Such a vehicle, machine, system or the like is hereinafter referred to as an "electric propulsion machine"). Examples of electric propulsion machines include apparatuses which incorporate a battery unit and an electric motor, such as two-wheeled vehicles, four-wheeled vehicles, electrically-assisted bicycles, snowmobiles, and helicopters, as well as outboard motors, jet propulsion units, and so on. Each of these apparatuses may additionally incorporate any other propulsion system as well, e.g., an engine. Although description of the preferred embodiments below will mainly illustrate a two-wheeled electric vehicle as an example of an electric propulsion machine, it may occasionally refer to other types of electric propulsion machines as well.

FIG. 1 is an external side view of a two-wheeled electric vehicle 1 according to a preferred embodiment of the present invention.

Hereinafter, the configuration of the two-wheeled electric vehicle 1, as well as the general outline of the two-wheeled electric vehicle 1, will be described.

The two-wheeled electric vehicle 1 includes a body frame 2, a front wheel 3, a rear wheel 4, an accelerator 5, an electric motor 6, and a seat 7. The two-wheeled electric vehicle 1 further includes a motor control unit 10 and a battery unit 20. The motor control unit is also called an "MCU" (Motor Control Unit), and may hereinafter be referred to as the "MCU 10".

The body frame 2 supports the seat 7. A rider seated on the seat 7 of the two-wheeled electric vehicle 1 will operate the accelerator 5, which is provided on the right hand side of the steering handlebar, to adjust the velocity of the two-wheeled electric vehicle 1. The accelerator 5 includes an accelerator position sensor 32 (FIG. 6; described below) provided thereon, which detects the extent to which the accelerator 5 is operated. The MCU 10 ensures that an electric power which is in accordance with the operated extent of the accelerator 5 is supplied from the battery unit 20 to the electric motor 6, thus controlling rotation of the electric motor 6. As the electric motor 6 rotates, a chain and gears not shown and the rear wheel 4 convert the rotary force from the electric motor 6 into thrust, which drives the two-wheeled electric vehicle 1. As a result of this, the two-wheeled electric vehicle 1 travels at a velocity as desired by the rider.

In the present specification, the device which generates thrust from the output (torque) of the electric motor 6, e.g., the rear wheel 4 being a driving wheel of the two-wheeled electric vehicle 1, and/or a chain or a belt (not shown) which transmits the thrust from the electric motor 6 to the rear wheel 4, may be referred to as "propulsion device". As for vehicles other than the two-wheeled electric vehicle 1, the following could correspond to a whole or a portion of the propulsion device: e.g., a track belt of a snowmobile, a propeller of a helicopter or an outboard motor, and rotor blades and stator blades of a jet propulsion unit.

The two-wheeled electric vehicle 1 has a plurality of operating modes. The plurality of operating modes differ from one another in terms of a relationship between the output torque and the number of revolutions of the electric motor. The present preferred embodiment assumes that the plurality of operating modes include a beginner mode intended for beginners, a normal mode intended for general users, and a power mode that enables high output, one of which is able to be selected. According to an operating mode which is designated from among the plurality of operating modes, the MCU 10 outputs a control signal to control the electric motor 6. Thus, even if the electric motor 6 may be rotating at the same number of revolutions, the output torque of the electric motor 6 is able to be varied among the different operating modes.

The setting of an operating mode as mentioned above preferably is to be made using the battery unit 20. In the present preferred embodiment, the battery unit 20 is located below the seat 7, and is detachable. While the battery unit 20 is detached from the two-wheeled electric vehicle 1, an administrator or a rider (hereinafter referred to as "an administrator or a like person") sets an operating mode on the battery unit 20. The battery unit 20 stores mode information representing the operating mode that has been set, and sends the mode information to the two-wheeled electric vehicle 1 at the time of being mounted to the two-wheeled electric vehicle 1. This causes the desired operating mode to be set for the two-wheeled electric vehicle 1.

Hereinafter, component elements of the battery unit 20 and the two-wheeled electric vehicle 1 which are related to the setting of an operating mode will be described in detail.

Figure 2:
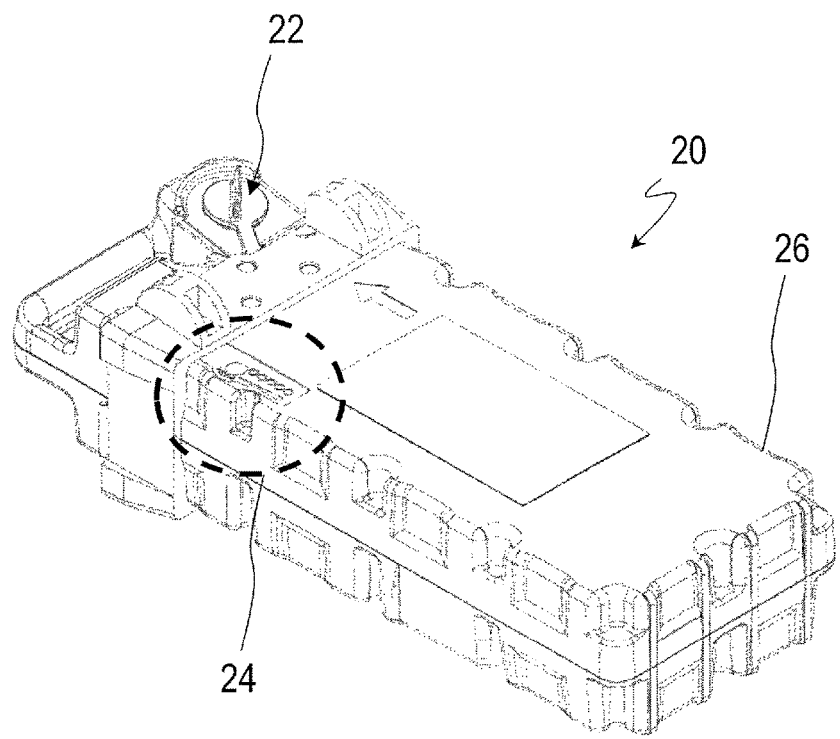
FIG. 2 is an external perspective view of a battery unit 20 according to a preferred embodiment of the present invention.
Figure 3:
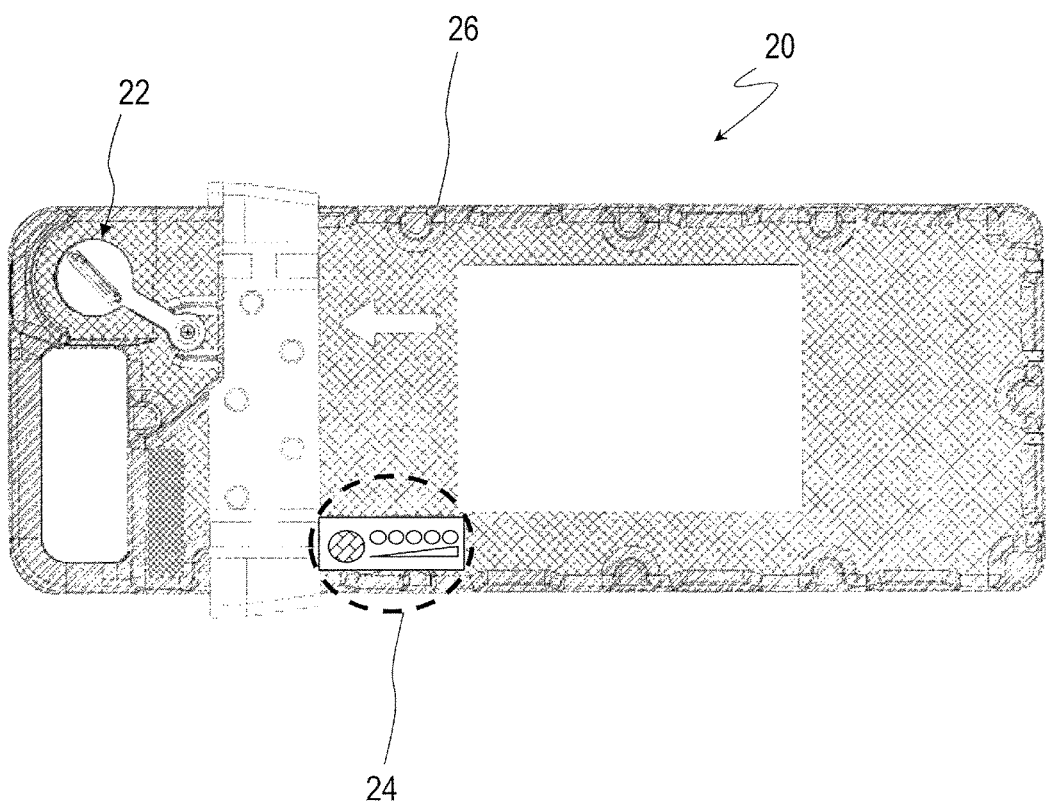
FIG. 3 is an external plan view of the battery unit 20 according to a preferred embodiment of the present invention.

FIG. 2 is an external perspective view of the battery unit 20 according to the present preferred embodiment. FIG. 3 is an external plan view of the battery unit 20 according to the present preferred embodiment. The battery unit 20 is protected by a case 26. The case 26 accommodates electrical circuitry to be described below, e.g., an electrical storage such as a battery cell or the like to store electricity and a battery control circuit (CPU). As shown in FIG. 2 and FIG. 3, a connector 22 and an operation panel 24 are provided on the surface of the case 26 of the battery unit 20.

In FIG. 3, a cap is placed on the connector 22. With the cap removed, the connector 22 includes a plurality of connection terminals provided therein.

Figure 4:
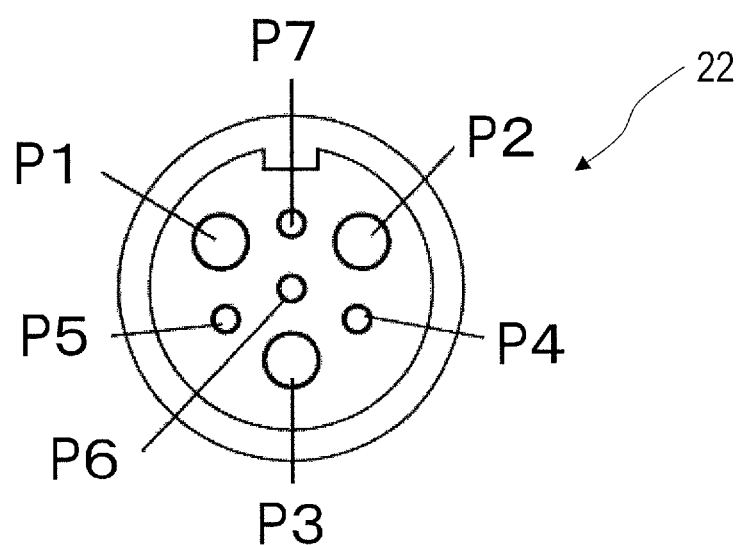
FIG. 4 is a schematic diagram of a connector 22 of the battery unit 20 according to a preferred embodiment of the present invention.

FIG. 4 schematically shows the connector 22 of the battery unit 20 according to the present preferred embodiment. The connector 22 includes seven pins, for example, which are denoted by respective pin numbers P1 to P7 for the purpose of illustration. In the present preferred embodiment, only the pins denoted by pin numbers P1, P2, and P6 will be described.

The pin of pin number P1 is a power line of the plus polarity, that is used when discharging electricity. The pin of pin number P2 is a power line of the minus polarity, i.e., a ground line, that is used when discharging electricity. The pin of pin number P6 is a data line that is used to communicate with the MCU 10 of the two-wheeled electric vehicle 1.

Figure 5:
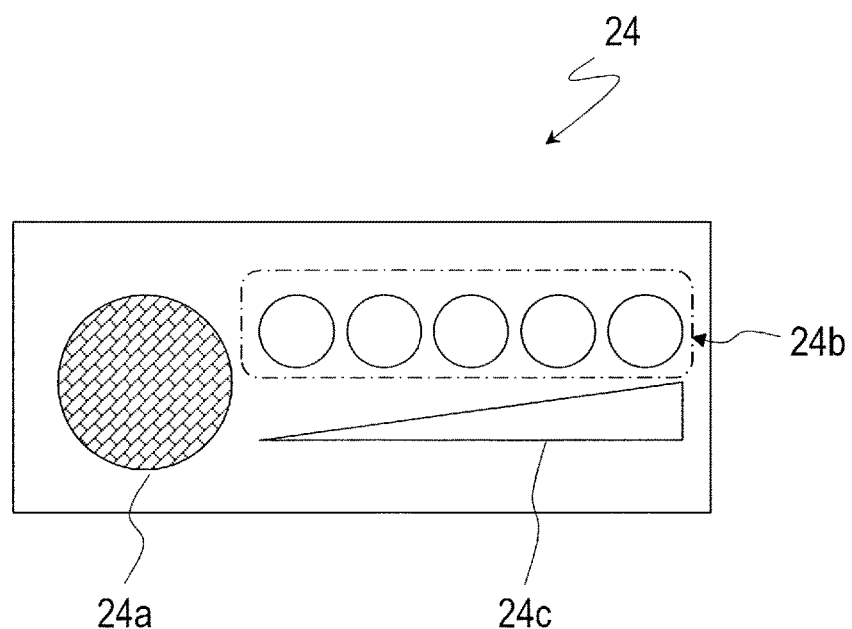
FIG. 5 is a schematic diagram of an operation panel 24 of the battery unit 20 according to a preferred embodiment of the present invention.

FIG. 5 schematically shows the operation panel 24 of the battery unit 20 according to the present preferred embodiment. The operation panel 24 includes a battery level indicator switch 24a, which preferably is a piece of hardware. The operation panel 24 further includes LEDs 24b, of which there are five, for example. The LEDs 24b function as a display to indicate the remaining amount of electricity that is stored in the battery unit 20. A gauge 24c provides a reference as to how much or little the remaining electricity there is. In FIG. 5, more LEDs to the right in the figure will become activated (lit) as there exists a larger remaining amount.

Generally speaking, the battery level indicator switch (hereinafter referred to as "indicator switch") 24a provided on the battery unit 20 is intended to indicate the remaining amount of electricity stored in the battery unit 20. In the present preferred embodiment, the indicator switch 24a being provided for this purpose also doubles as an input device with which to designate a desired operating mode from among the plurality of operating modes.

In the present preferred embodiment, depending on the length of time for which an administrator or a like person keeps the indicator switch 24a pressed, the LED(s) 24b being activated (lit) takes on a different meaning. Specifically, until a certain period passes after the indicator switch 24a is pressed, the number of LEDs 24b that are activated straightforwardly represents the remaining amount of electricity in the battery unit 20. On the other hand, when the indicator switch 24a has been continuously pressed for the certain period or longer, then the LED(s) 24b being activated represents an operating mode that is selectable. In the present preferred embodiment, as the duration of pressing the indicator switch 24a increases, the beginner mode, the normal mode, and then the power mode become selectable, consecutively in this order.

Hereinafter, details of the method of operating mode selection, and operations of the MCU 10 and the battery unit 20 to occur when the battery unit 20 is mounted to the two-wheeled electric vehicle 1, will be described.

Figure 6:
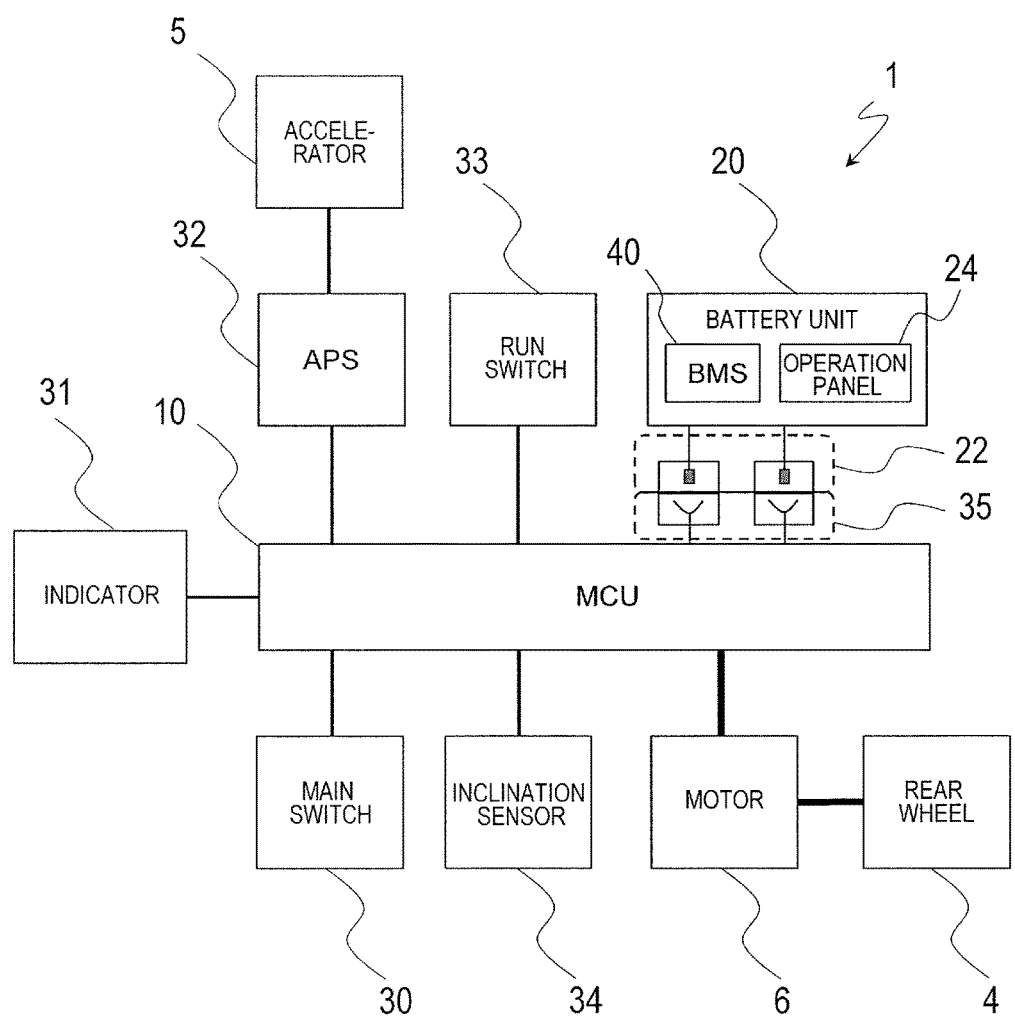
FIG. 6 is a hardware diagram of a driving system for the two-wheeled electric vehicle 1 according to a preferred embodiment of the present invention.

FIG. 6 is a hardware diagram of a driving system for the two-wheeled electric vehicle 1 according to the present preferred embodiment.

Figure 7:
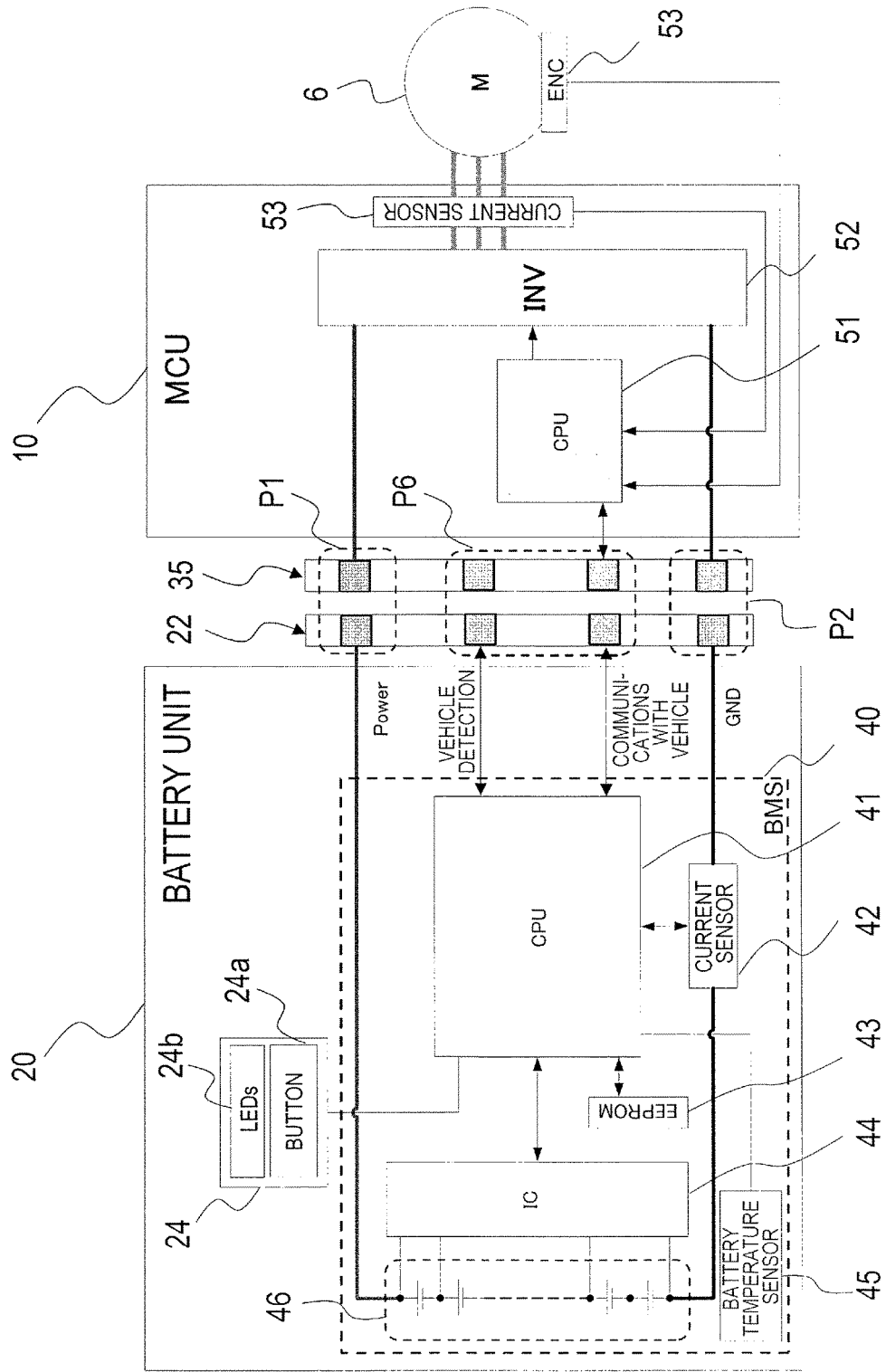
FIG. 7 is an internal circuitry diagram of a motor control unit (MCU) 10 and the battery unit 20.

As has already been described, the two-wheeled electric vehicle 1 includes the rear wheel 4, the accelerator 5, the electric motor 6, the MCU 10, and the battery unit 20. As the connector 22 of the battery unit 20 and the connector 35 of the MCU 10 become electrically and mechanically engaged, connection between the MCU 10 and the battery unit 20 is established. A battery management system 40, as well as the operation panel 24, is provided on the battery unit 20. The battery management system 40 may also be referred to in its abbreviated form, "BMS 40", hereinbelow. The internal circuitry of the battery unit 20, including the BMS 40, is shown in FIG. 7 and will be described below.

The two-wheeled electric vehicle 1 further includes a main switch 30, an indicator 31, the accelerator position sensor 32, a run switch 33, and an inclination sensor 34.

The main switch 30 is a switch to power ON or OFF the two-wheeled electric vehicle 1. When it is powered ON via the main switch 30 and with electricity being stored in the battery unit 20, a power voltage of, e.g., about 12 V is supplied to the MCU 10. As a result, electric power is supplied to the MCU 10 as well as other electrical components, thus enabling their operation. On the other hand, once it is powered OFF, the internal voltage drops to 0 V.

The indicator 31 includes one or more lamps that are activated in accordance with the operating state of the vehicle. The indicator 31 is provided at a position where it is easily visually recognizable by the rider, e.g., in the central portion of the steering handlebar.

The accelerator position sensor 32 senses the position of an accelerator grip (i.e., an amount of accelerator operation). The accelerator position sensor 32 sends information indicating the amount of accelerator operation to the MCU 10. Thu, the MCU 10 is able to control rotation of the electric motor 6 in accordance with the amount of accelerator operation.

The run switch 33 is a starter switch. After powering-on by the main switch 30, if it is further sensed that the run switch 33 is also pressed, then the MCU 10 operates the electric motor 6 to launch the two-wheeled electric vehicle 1.

The inclination sensor 34 senses an angle of inclination of the road or other surfaces that are traveled by the two-wheeled electric vehicle 1. Information indicating the sensed angle of inclination is sent to the MCU 10. The MCU 10 is able to know the vehicle attitude based on this information, for example. When the vehicle attitude indicates that the vehicle has fallen on its side, the MCU 10 limits the number of revolutions of the electric motor 6. As a result, the velocity of travel of the two-wheeled electric vehicle 1 is controlled.

Next, with reference to FIG. 7, the internal circuitry configuration of the MCU 10 and the battery unit 20 will be described in detail.

FIG. 7 is an internal circuitry diagram of the MCU 10 and the battery unit 20.

The MCU 10 and the battery unit 20 are electrically connected to each other via the connector 22 of the MCU 10 and the connector 35 of the battery unit 20. The pins denoted by pin numbers P1 and P2 are power lines through which electric power from the battery unit 20 is to be supplied, whereas the pin denoted by pin number P6 is a data line that performs mutual communications.

In FIG. 7, the data line is illustrated as being a plurality in number in order to indicate that the data line is utilized by the battery unit 20 for vehicle detection purposes and also for communications with the vehicle. Vehicle detection is realized by determining whether the battery unit 20 is able to communicate with the MCU 10 or not, for example.

Communications with the vehicle include communicating the aforementioned mode information.

First, the battery unit 20 will be described.

The battery unit 20 includes the operation panel 24 and the BMS 40. As described above, the operation panel 24 includes the indicator switch 24a and the LEDs 24b.

The BMS 40 includes a signal processing circuit (CPU) 41, a current sensor 42, a memory 43, an integrated circuit (IC) 44, a battery temperature sensor 45, and battery cells 46.

The CPU 41 controls the overall operation of the battery unit 20. Under the operation of the CPU 41, for example, protection functions as to overcharging, overdischarging, cell balancing, and the like are achieved. Other functions that may be achieved by the CPU 41 may include, for example, battery capacity management functions, protection and control functions such as restriction/prohibition/shutoff of regeneration, and charger control functions. Details of the main process of the CPU 41 in connection with the operation according to the present preferred embodiment will be described below. In the present specification, the CPU 41 may also be referred to as a "battery control circuit".

The current sensor 42 detects an electric current which flows from the battery unit 20 to the MCU 10. The result of this detection is sent to the CPU 41. Based on this current value, the CPU 41 is able to determine whether the electric power being supplied from the battery unit 20 is appropriate or not.

The memory 43 is a storage, such as an EEPROM. The memory 43 stores and retains mode information which identifies an operating mode that has been designated by an administrator or a like person.

The IC 44 monitors the amounts of charge that are stored in the battery cells 46, based on the voltage value of each battery cell, for example.

The battery temperature sensor 45 is a sensor which senses the temperature of the battery cells 46. The result of detection is sent to the CPU 41. Based on this temperature value, the CPU 41 is able to determine whether the battery unit 20 is overheating or not.

The battery cells 46 are an electrical storage that stores electricity. The battery cells 46 may be cells of a lithium ion fuel cell, for example. From the battery cells 46, a power line is taken out to be connected to the pin denoted by pin number P1, and a ground line is taken out to be connected to the pin denoted by pin number P2.

The MCU 10 includes a signal processing circuit (CPU) 51, an inverter circuit 52, and a current sensor 53.

Via the data line, the CPU 51 receives mode information indicating an operating mode which has been designated from among the plurality of operating modes, and based on this mode information, outputs a control signal to the inverter circuit 52 to control the electric motor 6. The control signal is preferably a PWM signal, i.e., a pulse-width modulated signal, for example. Thus, the electric motor 6 is made to rotate at a desired number of revolutions. The CPU 51 defines and functions as a control circuit to control the operation of the electric motor 6. In the present specification, the CPU 51 may also be referred to as an "electric motor control circuit".

The power lines from the battery unit 20 are connected to the inverter circuit 52. The inverter circuit 52 converts the DC electric power from the battery 22 into AC power. Based on the control signal received from the CPU 51, the inverter circuit 52 adjusts the amount of current that flows to the electric motor 6. The specific configuration of the inverter circuit 52 is well known, and any detailed description thereof is omitted herein. The current sensor 53 monitors the amount of current flowing in the electric motor 6, and sends to the CPU 51 a signal indicating the amount of current.

In accordance with the amount of current that is supplied from the MCU 10, the electric motor 6 changes its number of revolutions. An encoder 53 that senses the number of revolutions and the rotary position of the electric motor 6 is provided in connection with the electric motor 6. An output from the encoder 53 is sent to the CPU 51 to let the CPU 51 know the present number of revolutions, etc., of the electric motor 6.

Next, operations of the MCU 10 and the BMS 40 of the battery unit 20 will be described. First, a process through which the BMS 40 accepts a designation of an operating mode will be described.

Figure 8:
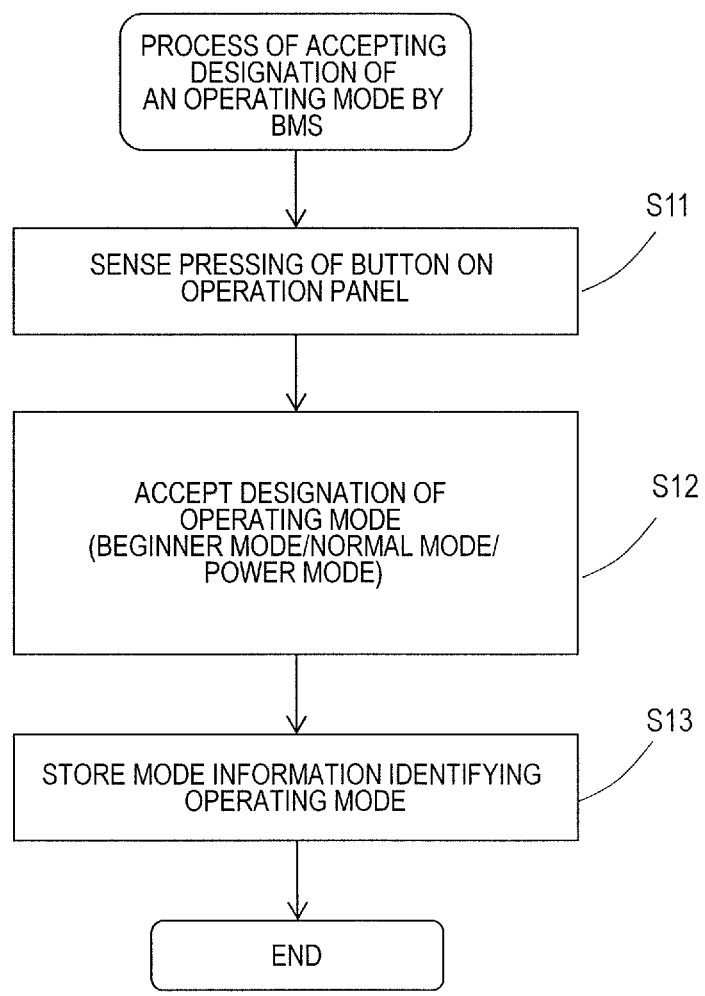
FIG. 8 is a flowchart illustrating a processing procedure of accepting a designation of an operating mode by using the battery unit 20 according to a preferred embodiment of the present invention.

FIG. 8 is a flowchart showing a processing procedure of accepting a designation of an operating mode by using the battery unit 20 according to the present preferred embodiment. The process shown in FIG. 8 is to be performed in a situation where the battery unit 20 is detached from the two-wheeled electric vehicle 1. Since the battery cells 46 defining a power source exist in the interior of the battery unit 20, the CPU 41 is able to operate by using electric power therefrom.

First, an administrator or a like person presses the indicator switch 24a in the operation panel.

At step S11, the CPU 41 senses pressing of the indicator switch 24a. At step S12, the CPU 41 determines an operating mode which is in accordance with the amount of time of pressing. At step S13, the CPU 41 stores mode information identifying the operating mode to the memory 43.

Hereinafter, with reference to FIG. 9, the process of step S12 to be performed by the CPU 41 will be described in detail.

Figure 9:
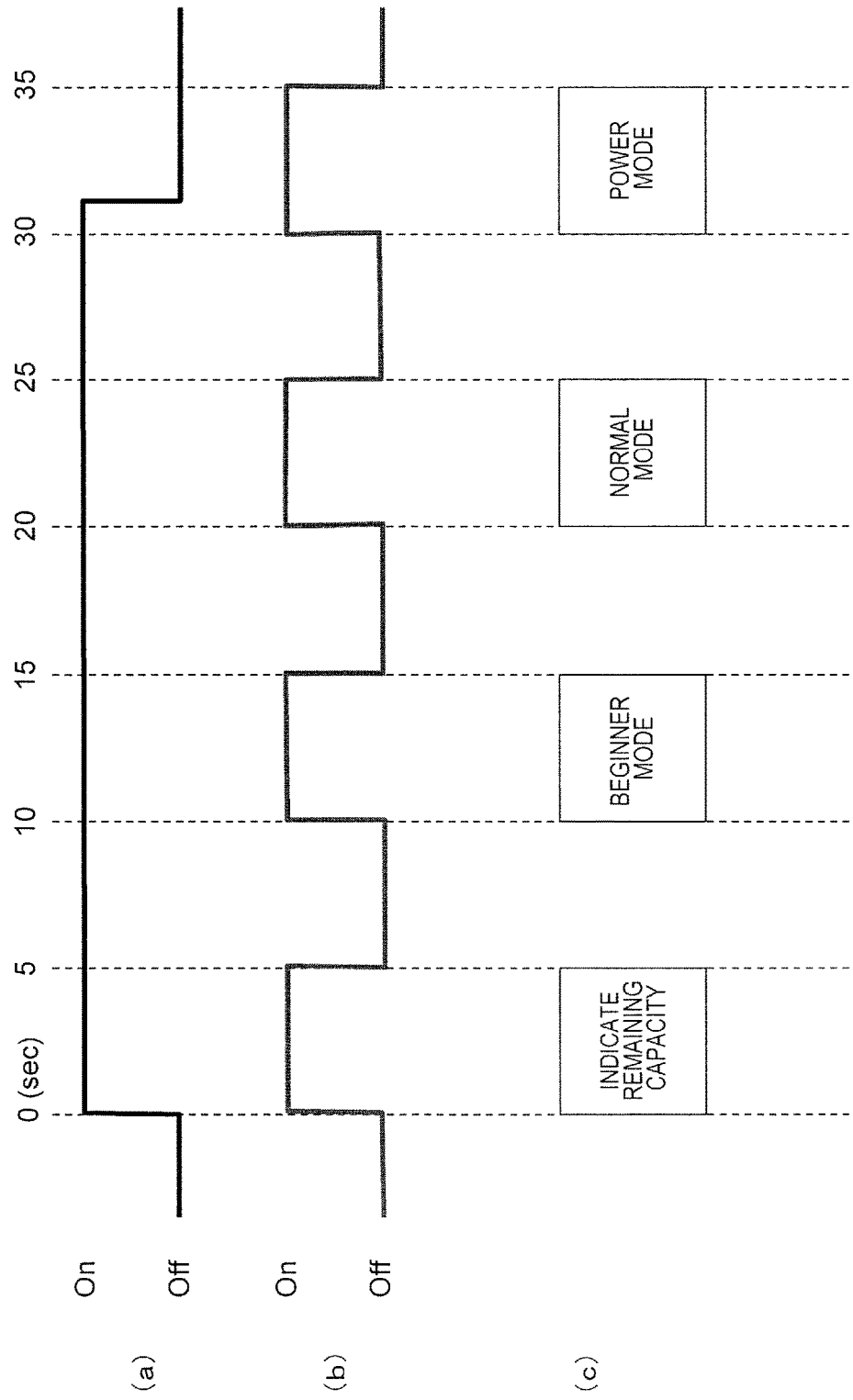

FIG. 9 illustrates operating modes to be assigned in accordance with an amount of time of pressing the indicator switch 24a. The horizontal axis represents a duration of pressing (second) T relative to a point in time at which the indicator switch 24a is pressed.

Portion (a) indicates whether the indicator switch 24a is pressed (On) or pressed (Off). The example of FIG. 9 illustrates a situation where the indicator switch 24a is pressed for about 31 seconds, for example.

Portion (b) indicates whether the LEDs 24b are activated (On) or deactivated (Off). Until, for example, 5 seconds after the indicator switch 24a is pressed (0≤T<5), the LEDs 24b indicate the remaining amount of electricity stored in the battery unit 20. At this point, a number of LEDs as adapted to the remaining amount are activated (lit).

During a period such that time T falls within 5≤T<10, the LEDs 24b are deactivated. Thereafter, the LEDs 24b are repeatedly activated and deactivated at an interval of every 5 seconds. In the example of FIG. 9, the LEDs 24b are activated in the period where 10≤T<15, deactivated in the period where 15≤T<20, activated in the period where 20≤T<25, deactivated in the period where 25≤T<30, and activated in the period where 30≤T<35.

As indicated by Portion (c), in the present preferred embodiment, a beginner mode, a normal mode, and a power mode are respectively assigned to the three periods (10≤T<15, 20≤T<25, 30≤T<35) during which the LEDs 24b are activated. When turning OFF of the indicator switch 24a is sensed in any of the periods during which the LEDs 24b are activated, the CPU 41 assumes that an operating mode associated with that period is being designated, and thus accepts that designation.

In the example of FIG. 9, the indicator switch 24a is turned OFF at time T=31. Therefore, the CPU 41 accepts a designation of the power mode being associated with the period 30≤T<35, which encompasses time T=31.

If the indicator switch 24a remains pressed even after time T=40, time T may be reset so that T=0, and the aforementioned process may be repeated all over again, for example.

Note that FIG. 9 and the above explanation are a mere example of designating an operating mode. It is not a requirement that activation and deactivation of the LEDs 24b be repeated every 5 seconds, and the method of designating an operating mode is not limited to continuous pressing of the indicator switch 24a. As another example concerning the latter, an operating mode may be designated based on the number of consecutive presses being made. For example, if the indicator switch 24a is pressed once, the LEDs 24b may indicate the remaining amount; if it is quickly pressed twice consecutively, the beginner mode may be set; if it is quickly pressed three times consecutively, the normal mode may be set; and if it is quickly pressed four times consecutively, the power mode may be set. For example, the CPU 41 may determine whether a plurality of presses have been made within an interval of 500 milliseconds, for example, between presses.

With the above-described method, mode information identifying an operating mode which has been designated by an administrator or a like person is stored in the battery unit 20. The format of the mode information to be stored in the memory 43 of the battery unit 20 may be arbitrary. For example, it may take one of three numerical values (e.g., 1 to 3) corresponding to the three operating modes, or a two-digit binary expression capable of identifying each of the three operating modes may be used.

There may be cases where none of the operating modes has been designated by an administrator or a like person, e.g., immediately after purchase of the two-wheeled electric vehicle 1. In anticipation of such cases, the memory 43 may previously store as an initial value mode information indicating the beginner mode, which provides the lowest output. Alternatively, when no mode information is found stored in the memory 43, the CPU 51 of the MCU 10 may set the beginner mode as an initial operating mode.

Next, operations of the MCU 10 and the battery unit 20 to occur when, in a situation where mode information is stored in the memory 43 of the battery unit 20, the battery unit 20 is mounted to the two-wheeled electric vehicle 1 will be described.

Figure 10:
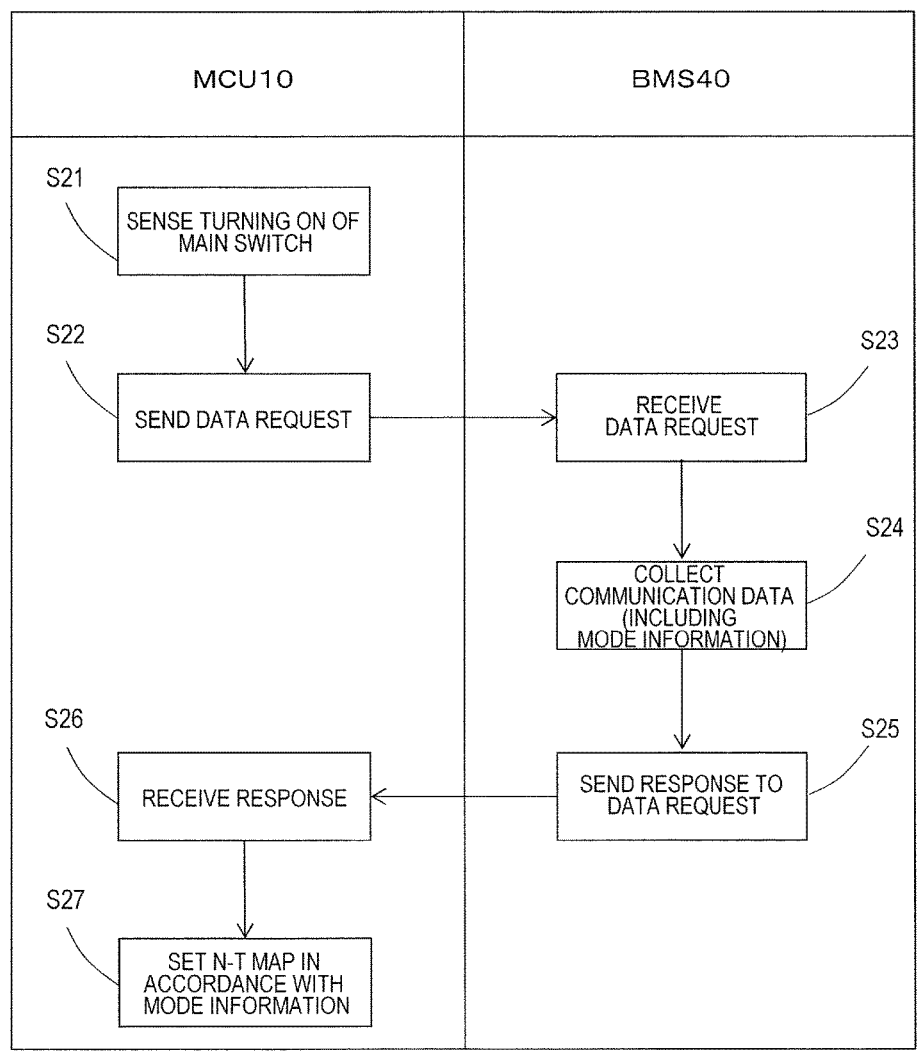
FIG. 10 is a diagram showing processing procedures which are respectively performed by a motor control unit (MCU) and a battery management system (BMS) of the two-wheeled electric vehicle 1 according to a preferred embodiment of the present invention when the main switch is ON, as well as communications to be performed between them.

FIG. 10 is a diagram showing processing procedures that are respectively performed by the MCU 10 and the battery unit 20 of the two-wheeled electric vehicle 1 according to the present preferred embodiment when the main switch is ON, as well as communications to be performed between them. The portion dedicated to the MCU 10 mainly concerns the processing by the CPU 51 of the MCU 10 (FIG. 7), while the portion dedicated to the BMS 40 mainly concerns the processing by the CPU 41 of the BMS 40 (FIG. 7). Steps S22 and S23 and steps S25 and S26 involve communications between the MCU 10 and the BMS 40.

At step S21, the CPU 51 of the MCU 10 senses turning ON of the main switch 30. As a prerequisite for the CPU 51 to operate, the battery unit 20 must have been mounted to the two-wheeled electric vehicle 1 and electric power must be supplied from the battery unit 20.

At step S22, in response to sensing the main switch 30 being turned ON, the CPU 51 sends a data request to the BMS 40 by using the data line of pin number P6. In the present preferred embodiment, a data request encompasses a request for mode information. It may also encompass a request for information concerning the remaining amount of electricity or the like.

At step S23, the CPU 41 of the BMS 40 receives the data request which has been sent from the MCU 10, via the data line of pin number P6.

At step S24, the CPU 41 collects data (communication data) to be sent to the MCU 10. Specifically, as the communication data, the CPU 41 reads mode information from the memory 43. As the communication data, the CPU 41 may generate other data through computation.

At step S25, in response to the data request, the CPU 41 sends the communication data by using the data line of pin number P6.

At step S26, the CPU 51 of the MCU 10 receives the communication data via the data line of pin number P6.

At step S27, the CPU 51 extracts mode information from the communication data, and sets an N-T map in accordance with the mode information.

Figure 11:
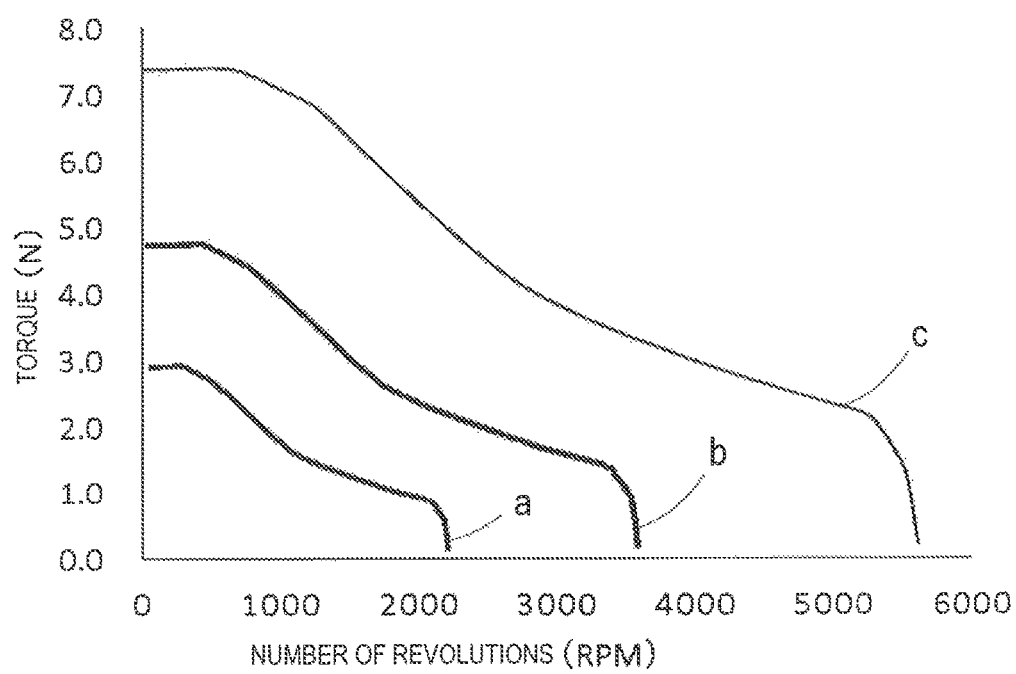
FIG. 11 is a diagram showing exemplary maps (N-T maps) corresponding to plurality of operating modes, each showing a relationship between the number of revolutions N and the torque T.

FIG. 11 is a diagram showing exemplary N-T maps a, b and c corresponding to a plurality of operating modes, each showing a relationship between the number of revolutions N and the torque T. The N-T map a corresponds to the beginner mode; the N-T map b corresponds to the normal mode; and the N-T map c corresponds to the power mode. As will be understood from FIG. 11, even if the electric motor 6 may be rotating at the same number of revolutions, the output torque of the electric motor 6 differs under different operating modes. The upper limits of the output torque and the number of revolutions increase in ascending order from the beginner mode, the normal mode, to the power mode.

For ease of explanation, FIG. 11 shows each relationship between the number of revolutions N and the torque T when the accelerator 5 is at its utmost position. It should be noted that additional one or more relationships between the number of revolutions and the torque may also be defined in adaptation to the position of the accelerator 5.

The relationship between the number of revolutions N and the torque T may be described in any arbitrary format. Instead of the graph shown in FIG. 11, for each map, a numerical table describing a relationship between different numbers of revolutions and the corresponding torque values may be provided. Alternatively, a mathematical function describing a relationship between the number of revolutions N and the torque T may be provided.

Through the above process, an operating mode which was previously set by an administrator or a like person while the battery unit 20 was detached is set to the MCU 10 of the two-wheeled electric vehicle 1, according to which the electric motor 6 is controlled. This ensures, particularly in the case where the administrator and the rider are different, that the rider will never makes changes to the operating mode setting that are unexpected by the administrator.

The above description illustrates an ability to designate an operating mode to the battery unit 20 while the battery unit 20 is detached from the two-wheeled electric vehicle 1. However, even while the two-wheeled electric vehicle 1 is mounted, a new operating mode may be set to the battery unit 20 by performing the aforementioned manipulation while the two-wheeled electric vehicle 1 is stopped, for example. As the CPU 41 of the BMS 40 notifies each newly set operating mode to the CPU 51 of the MCU 10, the MCU 10 becomes able to operate in the new operating mode. Since the battery unit 20 is located below the seat 7, it is still difficult to change a once-designated operating mode during an actual travel of the two-wheeled electric vehicle 1. Therefore, during travel, an operating mode that has been designated by an administrator or a like person is prevented from being changed.

The CPU 51 of the MCU 10 may keep any currently-set operating mode fixed and unchanged until the main switch 30 is turned once OFF, and allow a new operating mode to be reflected as the main switch 30 is turned once OFF and then ON again. Alternatively, the CPU 51 may allow a new operating mode to be reflected only when the two-wheeled electric vehicle 1 comes to a stop, so that the operating mode is kept fixed while the two-wheeled electric vehicle 1 is traveling.

The above example illustrates that the indicator switch 24*a*, which is normally used to allow the remaining amount of electricity to be indicated, is also able to be used in designating an operating mode. In the case where other switches or buttons are provided on the battery unit 20, any of such other switches or buttons may be utilized in designating an operating mode. For example, in the case where a button (selector) that diagnoses malfunctioning is provided on the battery unit 20, the selector may be used to designate an operating mode; otherwise, a dedicated selector may be provided to designate an operating mode.

Figure 12:
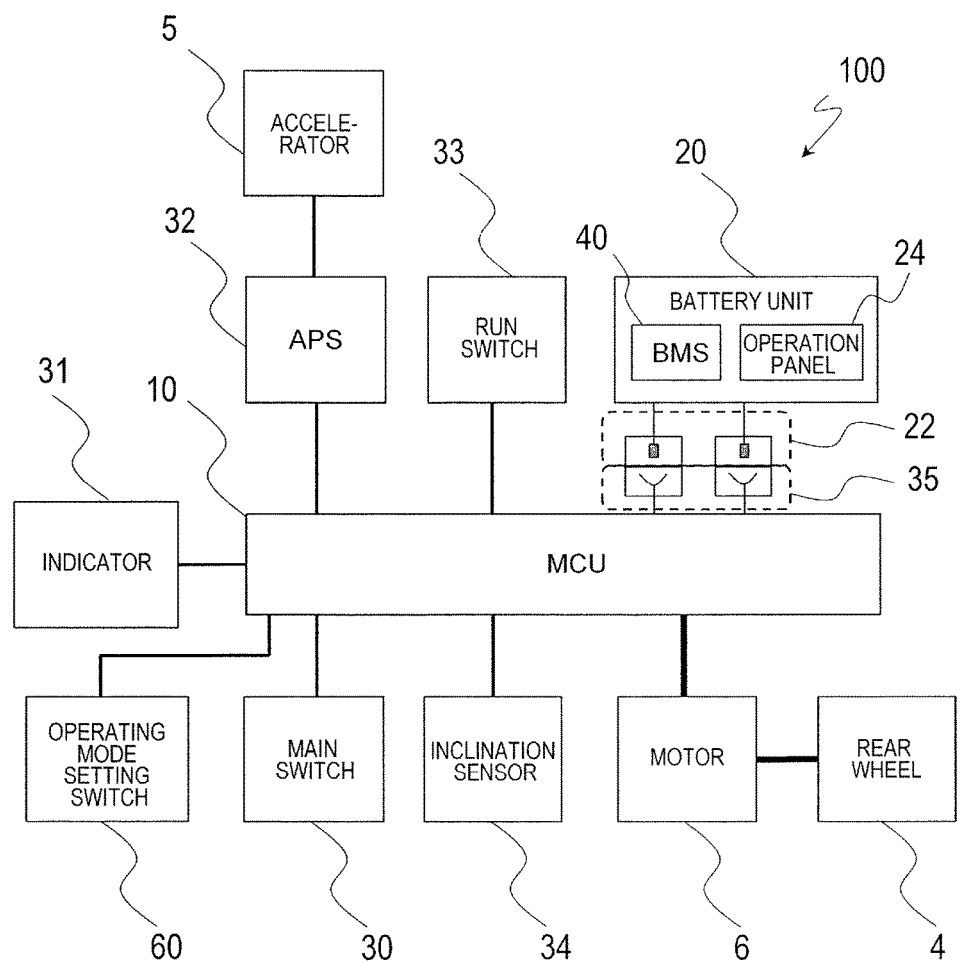
FIG. 12 is a hardware diagram of a two-wheeled electric vehicle 2 according to a preferred embodiment of the present invention, further including an operating mode setting switch.

FIG. 12 is a hardware diagram of a two-wheeled electric vehicle 100 according to a preferred embodiment of the present invention, which further includes an operating mode setting switch.

The two-wheeled electric vehicle 100 differs from the two-wheeled electric vehicle 1 shown in FIG. 6 in that an operating mode setting switch 60 is provided on the two-wheeled electric vehicle 100. The two-wheeled electric vehicle 100 is identical to the two-wheeled electric vehicle 1 in other aspects of the hardware, of which description will not be redundantly repeated here. As in the two-wheeled electric vehicle 1 of the preferred embodiments described above, the two-wheeled electric vehicle 100 also performs an operating mode designation using the battery unit 20.

The operating mode setting switch 60 is a switch which enables selection of an operating mode by the rider. Similarly to the preferred embodiments described above, one of a beginner mode, a normal mode, and a power mode is selectable as the operating mode in the present preferred embodiment. The operating mode setting switch 60 is disposed at a position where it is easily manipulated by the rider, e.g., around the steering handlebar. For example, the operating mode setting switch 60 may be disposed at a position similar to the switch for making a travel mode selection as disclosed in Japanese Laid-Open Patent Publication Nos. 2013-126788 and 9-193877.

Since the operating mode setting switch 60 is provided, the MCU 10 of the two-wheeled electric vehicle 100 will accept a designation of an operating mode using the battery unit 20 and also a designation of an operating mode using the operating mode setting switch 60. The relevant processing will be described with reference to FIG. 13.

Figure 13:
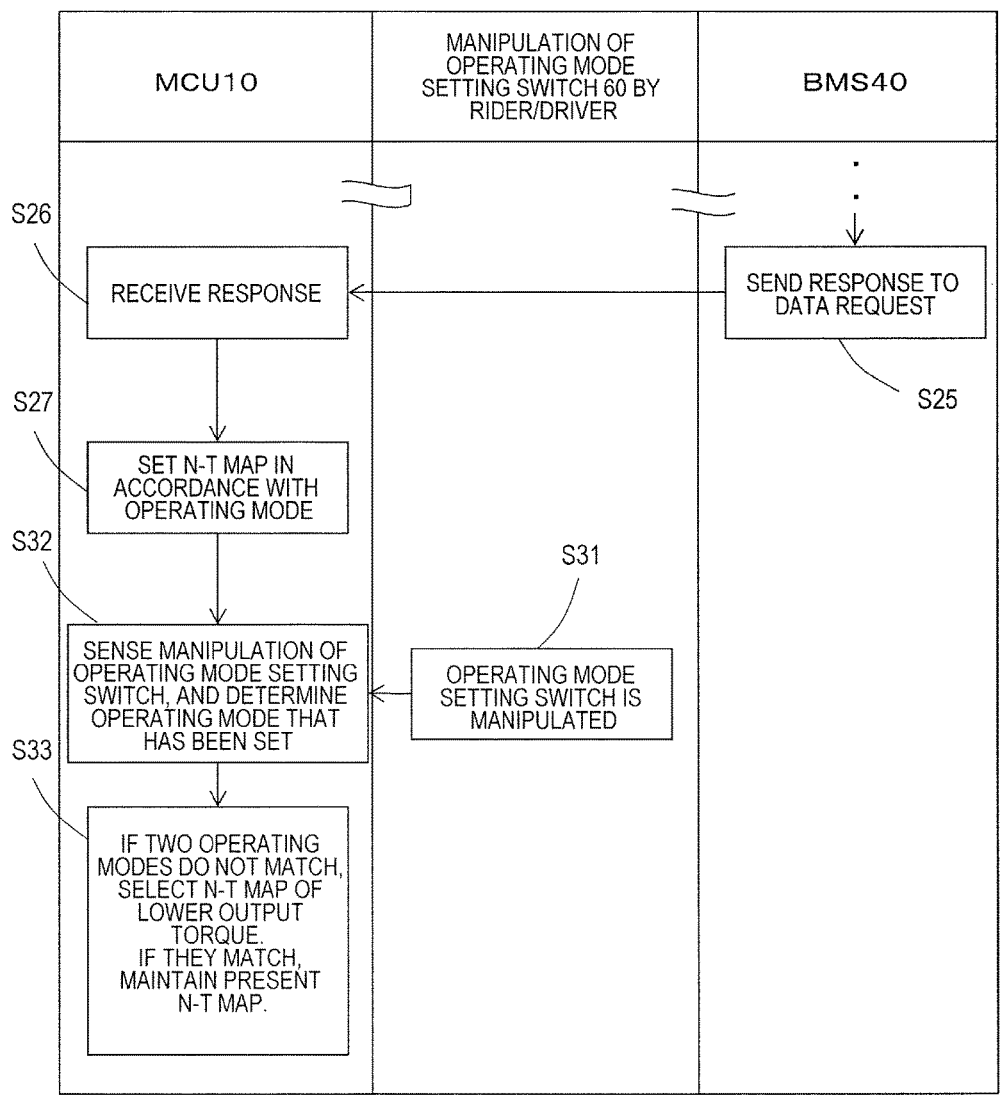
FIG. 13 is a flowchart mainly showing an example of processing by the motor control unit (MCU) in which either one of an operating mode which has been set by using the battery unit 20 or an operating mode which has been set by using the operating mode setting switch is used.

FIG. 13 is a flowchart mainly showing an example of processing by the MCU 10 where either one of an operating mode which has been set by using the battery unit 20 or an operating mode which has been set by using the operating mode setting switch 60 is used.

Steps S25 to S27 shown in FIG. 13 are identical to the processes denoted by the respectively identical step numbers in FIG. 10. It must be noted that these processes are to be preceded by the processes in FIG. 8 and the processes from steps S21 up to S24 in FIG. 10, for example; regarding these processes, the relevant description in the preferred embodiments described above should be relied upon.

First, at step S31, the rider manipulates the operating mode setting switch 60 in order to set a desired operating mode. Although this process in itself does not pertain to an operation of the two-wheeled electric vehicle 100 including the battery unit 20, it is nonetheless included in FIG. 13 for ease of understanding.

At step S32, the CPU 51 of the MCU 10 senses a manipulation of the operating mode setting switch 60 by the rider, and determines the operating mode that has been set.

At step S33, the CPU 51 determines whether the operating mode under the N-T map which was set at step S27 matches the operating mode that has been designated through manipulation of the operating mode setting switch 60 or not. If they do not match, the CPU 51 selects an N-T map having a lower output torque; if they match, the present N-T map is maintained as it is.

The processing in the case of non-matching will be described more specifically. First, a case will be discussed where the operating mode which was set by using the operating mode setting switch 60 is lower in output than the operating mode that has already been set. As used herein, being "lower in output" indicates either the beginner mode or the normal mode as from the power mode, or to the beginner mode as from the normal mode. In this case, the CPU 51 uses an N-T map that corresponds to the operating mode that has been set by using the operating mode setting switch 60.

Next, a case will be discussed where the operating mode which was set by using the operating mode setting switch 60 is higher in output than the operating mode that has already been set. As used herein, "higher in output" indicates either the normal mode or the power mode as from the beginner mode, or to the power mode as from the normal mode. In this case, the CPU 51 ignores the operating mode that has been set by using the operating mode setting switch 60, and maintains the present N-T map as it is.

Through the above processes, even if the rider happens to select an operating mode which is higher in output than an operating mode that was previously set by using the battery unit 20, that operating mode will never be used.

On the other hand, if the rider selects an operating mode which is lower in output than an operating mode that was previously set using the battery unit 20, the operating mode will be changed to the one that has a lower output.

By providing the operation panel 24 in the battery unit 20, and also providing the operating mode setting switch 60 in the two-wheeled electric vehicle 1, the method of setting an operating mode is able to be further diversified. For example, the preferred embodiments described above illustrate that the beginner mode is set as an initial operating mode when no operating mode has been designated by an administrator or a like person. However, in the present preferred embodiment, if no operating mode has been set at the battery unit 20 side, the CPU 51 may straightforwardly treat it as "absence of settings", and in response to a manipulation of the operating mode setting switch 60, accept a designation of an operating mode. In the case where there is no need for operating mode management by an administrator, this allows the rider to make his or her own determination of an operating mode.

A "free mode" may be provided as a mode to explicitly permit the rider to make his or her own determination of an operating mode. Under the "free mode", the rider is able to switch the operating mode at liberty, by using the operating mode setting switch 60 of the two-wheeled electric vehicle 1.

Furthermore, a "limited mode" may be provided. The "limited mode" means fixing the operating mode. Specifically, once an operating mode has been set by using the operation panel 24 of the battery unit 20, the CPU 51 will always control the two-wheeled electric vehicle 1 under that operating mode, and will not accept any manipulation of the operating mode setting switch 60.

The aforementioned "free mode" and "limited mode" may both be selectable by using the operation panel 24 of the battery unit 20. In other words, these may be included among the operating modes.

Although the description of the preferred embodiments of the present invention above assumes the battery unit 20 is a secondary battery, a fuel cell may be used instead of a secondary battery. In a vehicle which operates on a fuel cell, too, a battery unit 20 that stores generated electricity in a secondary battery may be incorporated; in that case, the aforementioned mode selector (a button, a switch, etc.) may be provided on the fuel cell and/or the battery unit 20.

Preferred embodiments of the present invention are particularly useful in vehicles which generate thrust by utilizing electric power from the battery unit 20, e.g., two-wheeled vehicles, four-wheeled vehicles, electrically-assisted bicycles, snowmobiles, helicopters, outboard motors, jet propulsion units, and the like, each of these including a battery unit 20 and an electric motor.

While the present invention has been described with respect to exemplary preferred embodiments thereof, it will be apparent to those skilled in the art that the disclosed invention may be modified in numerous ways and may assume many preferred embodiments other than those specifically described above. Accordingly, it is intended by the appended claims to cover all modifications of the present invention that fall within the true spirit and scope of the invention.

This application is based on Japanese Patent Application No. 2015-204485 filed on Oct. 16, 2015, the entire contents of which are hereby incorporated by reference.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An electric propulsion machine comprising:
    an electric motor;
    an electric motor control circuit to output a control signal to control the electric motor based on an operating mode which is designated from among a plurality of operating modes;
    a propulsion device to generate thrust from an output of the electric motor; and
    a battery unit to supply electric power to the electric motor, the battery unit including a mode selector via which a designation of the operating mode is accepted.

2. The electric propulsion machine of claim 1, wherein the battery unit is detachable and includes a connector which, when the battery unit is mounted to the electric propulsion machine, electrically connects the battery unit to the electric motor and the electric motor control circuit of the electric propulsion machine.

3. The electric propulsion machine of claim 2, wherein the battery unit accepts the designation of the operating mode while being detached from the electric propulsion machine.

4. The electric propulsion machine of claim 3, wherein the battery unit includes a storage to store mode information identifying the designated operating mode.

5. The electric propulsion machine of claim 4, wherein the battery unit further includes:
    an electrical storage to store electricity; and
    a battery control circuit to control an electric power which occurs through discharge from the electrical storage; and
    when the battery unit is mounted to the electric propulsion machine, the battery control circuit reads the mode information from the storage, and sends the mode information to the electric motor control circuit.

6. The electric propulsion machine of claim 5, further comprising a main switch to power on the electric propulsion machine; wherein
    when the battery unit is mounted to the electric propulsion machine, the battery control circuit reads the mode information from the storage in response to turning ON of the main switch.

7. The electric propulsion machine of claim 6, wherein, in response to turning ON of the main switch, the electric motor control circuit outputs a data request; and
    in response to receiving the data request, the battery control circuit reads the mode information from the storage.

8. The electric propulsion machine of claim 5, wherein the battery unit further includes a display to indicate a remaining amount of electricity stored in the electrical storage; and
    when the mode selector receives a predetermined manipulation, the display indicates the remaining amount of electricity.

9. The electric propulsion machine of claim 1, wherein the mode selector is a hardware switch or a button.

10. The electric propulsion machine of claim 1, wherein the battery unit further includes:
    a display;
    a control circuit to cause the display to indicate information of the plurality of operating modes; and
    a touch screen panel to accept the designation of the operating mode which is selected from among the plurality of operating modes indicated on the display; and
    the mode selector includes the display and the touch screen panel.

11. The electric propulsion machine of claim 1, further comprising a seat, wherein the battery unit is disposed below the seat.

12. The electric propulsion machine of claim 1, wherein the plurality of operating modes differ from one another in a relationship between an output torque and a number of revolutions of the electric motor.

13. The electric propulsion machine of claim 12, wherein the plurality of operating modes are provided as:
    a table describing a relationship between an output torque and a number of revolutions of the electric motor; or
    a mathematical function.

14. The electric propulsion machine of claim 12, further comprising a mode selection switch to select from among the plurality of operating modes, the mode selection switch being distinct from the mode selector; wherein
    when an operating mode selected with the mode selection switch and an operating mode designated with the mode selector are not identical, the electric motor control circuit selects the operating mode which has a lower output torque.

15. The electric propulsion machine of claim 12, further comprising a mode selection switch to select from among the plurality of operating modes, the mode selection switch being distinct from the mode selector; wherein
    when no operating mode has been set by the mode selector, or the mode selector has set a free mode to permit free switching of operating modes, the electric motor control circuit selects the operating mode selected with the mode selection switch.

16. A battery unit to be mounted to an electric propulsion machine to supply electric power, the battery unit comprising:
    an electrical storage to store electricity;
    a connector to output an electric power which occurs through discharge from the electrical storage;
    a battery control circuit to control the electric power which is output through the connector;
    a mode selector to accept a designation of an operating mode for the electric propulsion machine; and
    a case accommodating the electrical storage and the battery control circuit, the connector and the mode selector being provided on the case.

17. The battery unit of claim 16, wherein, when the connector is electrically connected to the electric propulsion machine, the battery control circuit outputs mode information identifying the designated operating mode from the connector.

18. The battery unit of claim 17, wherein the battery control circuit outputs the mode information in response to turning ON of a main switch of the electric propulsion machine.

19. The battery unit of claim 16, wherein the battery unit further includes a storage, and the storage stores mode information identifying the operating mode designated with the mode selector.

20. The battery unit of claim 16, further comprising a display to indicate a remaining amount of electricity stored in the electrical storage; wherein
    when the mode selector accepts a predetermined manipulation, the display indicates the remaining amount of electricity.

* * * * *